(12) United States Patent
Yuan et al.

(10) Patent No.: US 11,262,960 B1
(45) Date of Patent: Mar. 1, 2022

(54) CACHE MANAGEMENT IN A PRINTING SYSTEM IN A VIRTUALIZED COMPUTING ENVIRONMENT

(71) Applicant: VMware, Inc., Palo Alto, CA (US)

(72) Inventors: Hui Yuan, Beijing (CN); Weigang Huang, Beijing (CN); Mangui She, Beijing (CN); Qi An, Beijing (CN); Hui Zhang, Beijing (CN); Kun Shi, Beijing (CN)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 17/084,641

(22) Filed: Oct. 30, 2020

(51) Int. Cl.
*G06F 12/00* (2006.01)
*G06F 3/12* (2006.01)
*G06F 12/123* (2016.01)
*G06F 12/122* (2016.01)

(52) U.S. Cl.
CPC .......... *G06F 3/1263* (2013.01); *G06F 3/122* (2013.01); *G06F 3/1205* (2013.01); *G06F 3/1259* (2013.01); *G06F 3/1274* (2013.01); *G06F 12/122* (2013.01); *G06F 12/123* (2013.01); *G06F 2212/1021* (2013.01)

(58) Field of Classification Search
CPC .... G06F 3/1263; G06F 3/1205; G06F 3/0641; G06F 3/1274; G06F 3/122; G06F 11/1453; G06F 16/1748; G06F 12/123

USPC ..... 358/1.13, 1.15, 1.16, 405, 403; 707/664, 707/692, 698, 831
See application file for complete search history.

(56) References Cited

U.S. PATENT DOCUMENTS

| | | | | |
|---|---|---|---|---|
| 6,115,132 | A | * 9/2000 | Nakatsuma | ........... G06F 3/1205 358/1.14 |
| 2013/0091102 | A1 | * 4/2013 | Nayak | ..................... G06F 3/067 707/692 |
| 2015/0067283 | A1 | * 3/2015 | Basu | ..................... G06F 3/0641 711/162 |

OTHER PUBLICATIONS

Microsoft Corporation, "Introduction to Print Processors," available at https://docs.microsoft.com/en-us/windows-hardware/drivers/print/introduction-to-print-processors, Apr. 20, 2017, 2 pages.
(Continued)

*Primary Examiner* — Jamares Q Washington
(74) *Attorney, Agent, or Firm* — Su IP Consulting

(57) ABSTRACT

A varied least recently used (VLRU) caching technique is used to enable print data to be available at a cache of a client for printing, even after an agent performs a deletion of a hash value for the print data at a cache of the agent. The deletion of the print data (cached at the cache of the client) is postponed at the client device via the use of a waiting list, so that the cached print data can be printed at a physical printer of the client, in response to receiving a delayed print job from the agent that specifies the hash value as a result of a deduplication process performed by the agent.

21 Claims, 11 Drawing Sheets

(56) References Cited

OTHER PUBLICATIONS

Microsoft Corporation, "Introduction to Print Providers," available at https://docs.microsoft.com/en-us/windows-hardware/drivers/print/introduction-to-print-providers, Apr. 20, 2017, 3 pages.
Citrix Systems, Inc., "Maintain the printing environment," available at https://docs.citrix.com/en-us/xenapp-and-xendesktop/7-15-Itsr/printing/printing-maintain-environment.html, Oct. 29, 2018, 4 pages.
Wikimedia Foundation, Inc., "Cache replacement policies," available at https://en.wikipedia.org/wiki/Cache_replacement_policies, Jul. 17, 2020, 9 pages.

\* cited by examiner

CACHE MANAGEMENT IN A PRINTING SYSTEM IN A VIRTUALIZED COMPUTING ENVIRONMENT

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources in a virtualized computing environment may include central processing unit (CPU) resources, memory resources, storage resources, network resources, etc.

One example use of a virtualized computing environment is for a virtual desktop infrastructure (VDI) implementation, which is a type of desktop virtualization that allows a desktop to run on VMs that are provided by a hypervisor on a host. A user/client uses the operating system (OS) and applications (which reside and execute at the VM) via an endpoint device of the user, just as if the OS/applications were actually running locally on the endpoint device.

VDI implementations provide the user with printing capability, so that the user can issue print jobs from the virtual desktop at the VM, and then the printing is performed at a physical printer that is connected to the user's endpoint device (client device). However, printing in a virtualized computing environment (such as one that is implementing VDI) is prone to caching limitations and errors, which may result in failed print jobs at the physical printer of the client device.

DETAILED DESCRIPTION

Figure 1:
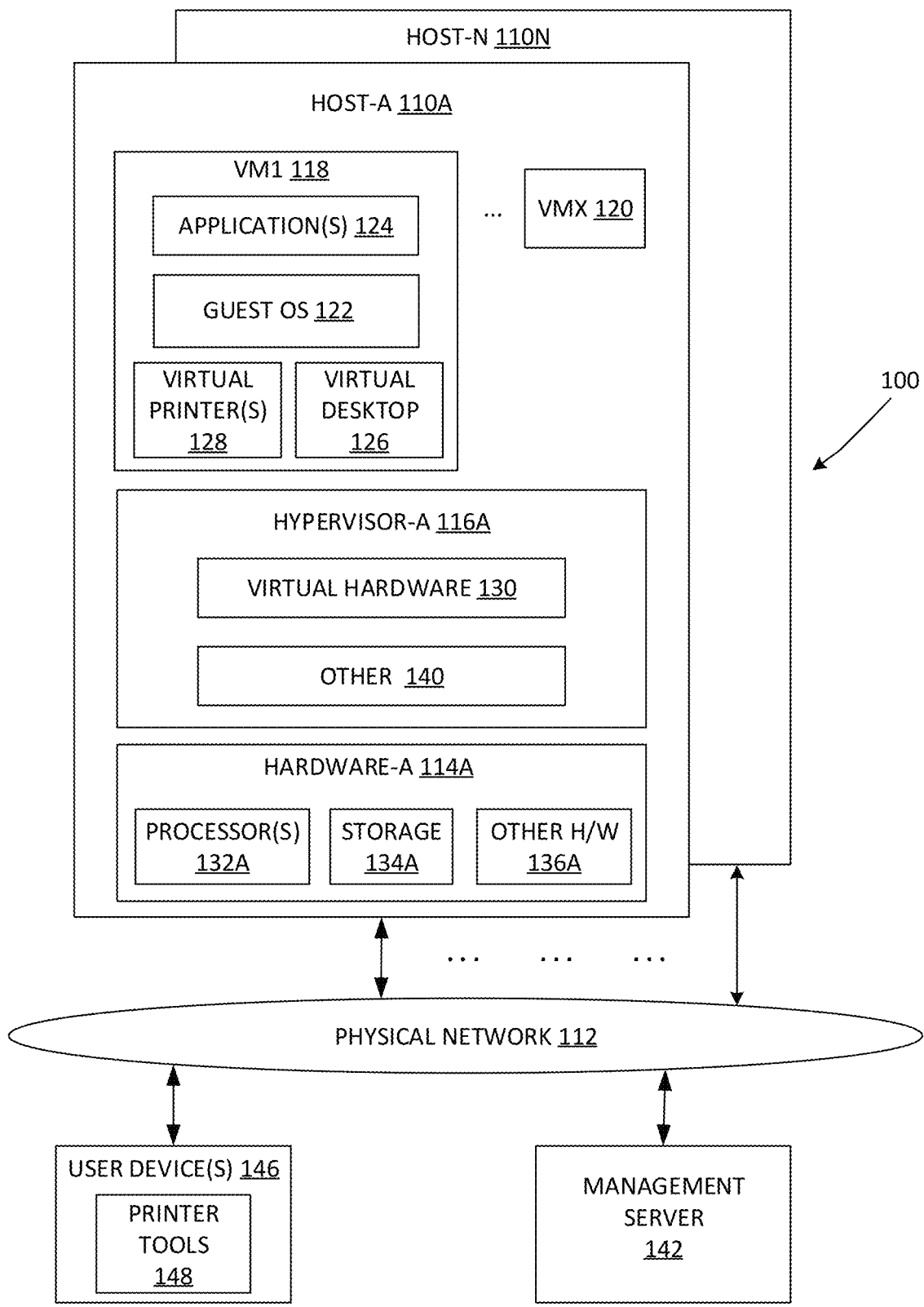
FIG. 1 is a schematic diagram illustrating an example virtualized computing environment that can implement a VDI with printing capability.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses drawbacks when executing print jobs from virtual desktops in virtualized computing environments. A caching method, referred to herein as a varied least recently used (VLRU) caching method, implements adding, deleting, and updating operations for a printer cache and reduces the chances of losing cached data at a client side when deduplication is performed at an agent side for the update operation.

Computing Environment

To further explain the details of the VLRU method and how the VLRU method improves the printing process in a virtual desktop infrastructure (VDI) or other type of virtual desktop environment, reference is first made herein to FIG. 1, which is a schematic diagram illustrating an example virtualized computing environment 100 that can implement VDI with printing capability. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . VMX 120. In practice, the virtualized computing environment 100 may include any number of hosts (also known as a computing devices, host computers, host devices, physical servers, server systems, physical machines, etc.), wherein each host may be supporting tens or hundreds of virtual machines. For the sake of simplicity, the details of only the single VM1 118 is shown and described herein.

VM1 118 may be an agent-side VM that includes a guest operating system (OS) 122 and one or more guest applications 124 (and their corresponding processes) that run on top of the guest OS 122. Using the guest OS 122 and/or other resources of VM1 118 and the host-A 110A, VM1 118 may generate a virtual desktop 126 that is operated by and accessible to one or more client-side user device(s) 146 via the physical network 112. One or more virtual printers 128 may be instantiated in VM1 118 and/or elsewhere in the host-A 110A. VM1 118 may include other elements, such as code and related data (including data structures), engines, etc., which will not be explained herein in further detail, for the sake of brevity. The user device 146 may include printer tools 148 (explained in more detail in FIG. 2) to support print jobs at physical printers that are locally connected to the user device 146.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs. The hypervisor-A 116A may include other elements (shown generally at 140), including tools to support print jobs that are issued by VM1 118 to the virtual printers 128 and various other tools to provide resources for and to otherwise support the operation of the VMs.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the application(s) 124 (e.g., a word processing application, accounting software, a browser, etc.) in VM1 118. Corresponding to the hardware 114A, the virtual hardware 130 may include a virtual CPU, a virtual memory (including agent-side caches used for print jobs for the virtual printers 128), a virtual disk, a virtual network interface controller (VNIC), etc.

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster.

The management server 142 may be communicatively coupled to host-A 110A . . . host-N 110N (and hence communicatively coupled to the virtual machines, hypervisors, hardware, etc.) via the physical network 112. In some embodiments, the functionality of the management server 142 may be implemented in any of host-A 110A . . . host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Figure 2:
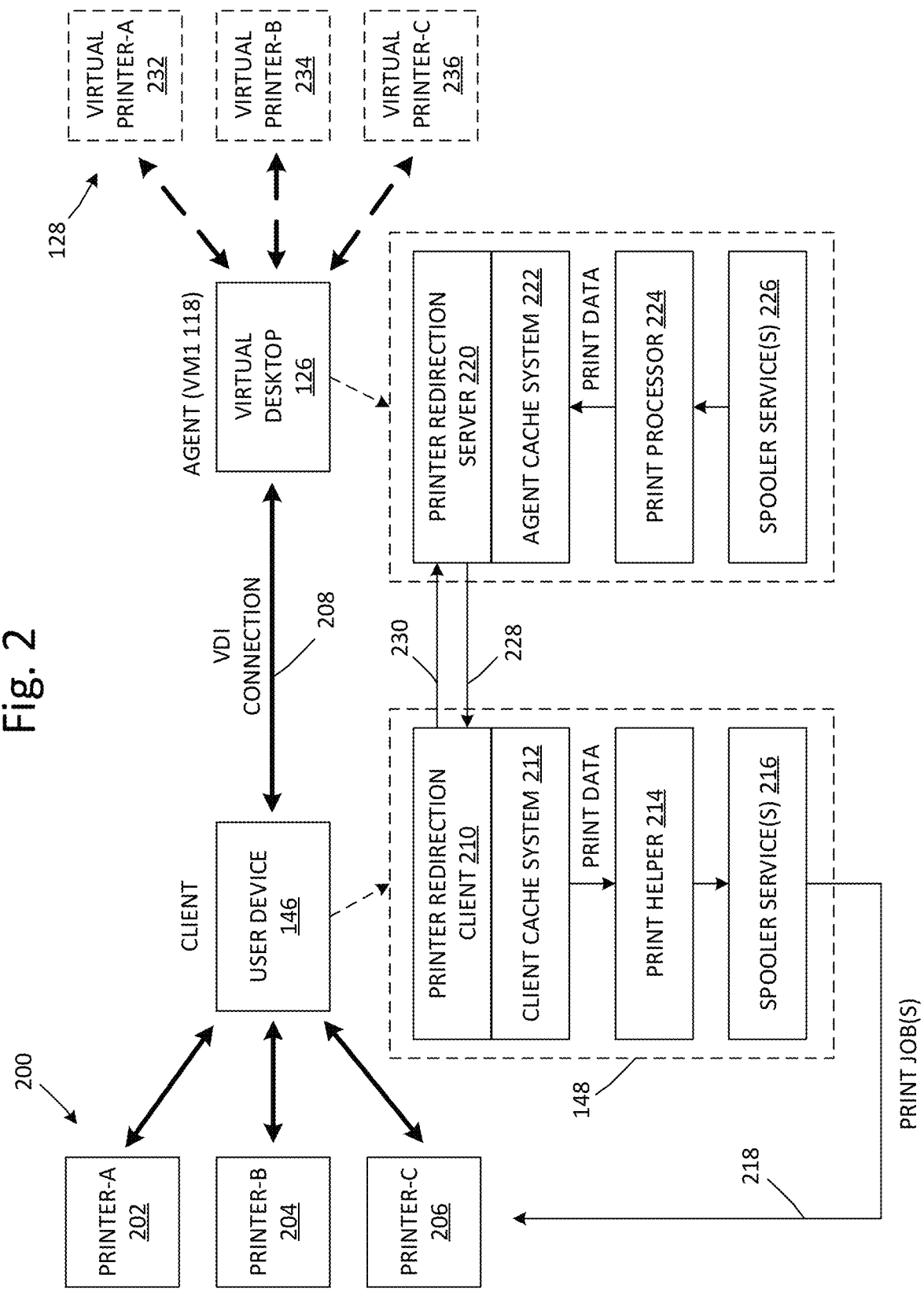
FIG. 2 is a diagram illustrating client and agent devices and printers for the virtualized computing environment of FIG. 1.

FIG. 2 is a diagram illustrating client and agent devices and printers for the virtualized computing environment 100 of FIG. 1. More specifically, FIG. 2 shows the client (e.g., the user device 146), the agent (e.g., the VM1 118 that provides the virtual desktop 126), and their associated elements and printers that execute print jobs.

At the client side, the user device 146 is connected (via a network, universal serial bus (USB), or other wired/wireless connection) to a plurality of physical printers 200. The physical printers 200 include, for instance, a printer-A 202, a printer-B 204, and a printer-C 206. The user device 146 access, operates, or otherwise communicates with the virtual desktop 126 running on VM1 118 at the agent side, via a VDI connection 208 provided by the physical network 112.

The printer tools 148 of the user device 146 include a printer redirection client 210 along with a client cache system 212 as a sub-component. The printer tools 148 also include a print helper 214 and spooler service(s) 216 that operate in conjunction with the printer redirection client 210 and the client cache system 212 to prepare and send (shown at 218) print data for print jobs to the printers 200.

Correspondingly installed at the agent side is a printer redirection server 220 along with an agent cache system 222 as a sub-component, a print processor 224, and spooler service(s) 226 that operate in conjunction with the printer redirection server 220 and the agent cache system 222 to prepare and send (shown at 228) print data to the printer redirection client 210 for printing at the printers 200. One or more of the printer redirection server 220, the agent cache system 222, the print processor 224, and the spooler service(s) 226 can reside at VM1 118 or elsewhere in the host-A 110A.

When the VDI connection 208 is established between the client and the agent, information regarding the printers 200 is sent (shown at 230) from the printer redirection client 210 to the printer redirection server 220 via the VDI connection 208. This information is used by the printer redirection server 220 to instantiate the virtual printers 128. Thus, the virtual printers 128 include a virtual printer-A 232, a virtual printer-B 234, and a virtual printer-C 236 that respectively represent the physical printer-A 202, printer-B 204, and printer-C 206.

In operation, when the virtual desktop 126 issues a print job for one of the virtual printers (for instance, the virtual printer-C 236), the print processor 224 gets the print data from the spooler service(s) 226 and converts the print data to an appropriate format, and sends the print data to the agent cache system 222 so that the printer redirection server 220 can then transfer (at 228) the print data to the printer redirection client 210 at the client side. When the client cache system 212 receives the print data, the client cache system 212 sends the print data to the print helper 214. The print helper 214 will then write, via the spooler service(s) 216, the print data to the printer-C 206 for printing.

The above-described process involves a situation when the to-be-printed print data is new data, and so the print data itself is transferred from the agent side to the client side. However, in other situations, frequently used print data may need to be printed, and it is inefficient for the agent side to repeatedly send the same print data again to the client side. Therefore, some implementations use deduplication and hashing techniques in conjunction with caching, in order to advantageously reduce the amount of data transfer from the agent side to the client side, and thus provide more efficient and improved performance and better bandwidth utilization.

Specifically, at the agent side, the print data from the virtual desktop 126 is hashed (e.g., via MD5 or other hashing algorithm) by the printer redirection server 220 or some other component at the agent side, so as to generate a hash value or other fingerprint that uniquely identifies the print data. If the print data is new data, then the agent side sends the hash value and the actual print data to the client side. The agent side also stores the hash value (and not the actual print data) in the agent cache system 222, and the client side in turn stores both the hash value and the actual print data in the client side cache system 212.

On the other hand, if the print data received from the virtual desktop 126 is a repeat copy of previous data, the agent side should try to avoid resending that same/repeated data. Accordingly, deduplication is performed in which the printer redirection server 220 determines whether a hash value of the received print data matches a hash value that is currently stored in the agent cache system 222. If a matching hash value is found in the agent cache system 222, which indicates to the printer redirection server 220 that the corresponding print data is also cached at the client cache system 212, then the printer redirection server 220 need only send the hash value (and not send the repeat/duplicate of the print data) to the printer redirection client 210, so that the printer redirection client 210 can use that hash value to locate the corresponding print data in the client cache system 212 for printing.

In order for the above-described caching, hashing, and deduplication process to work properly, there are some configuration/operational requirements. First, the contents of the agent cache system 222 and the contents of the client cache system 212 need to maintain consistency/coherency with each other. That is, when deduplication is performed wherein the agent side finds the hash value of the print data in the agent cache system 222 and therefore sends the hash value of the print data (and not the actual print data) to the client side, the agent side is assuming that both caches are consistent with each other in that the corresponding print data is still cached at the client side and thus can be located/restored for printing. Thus, cache coherency/consistency requires that if a hash value is still cached at the agent side, the corresponding print data must also still be cached at the client side.

Second, caches have a maximum size limit (e.g., when a cache is full, cache entries will need to be removed in order to add new cache entries). Accordingly, cache management becomes an important consideration when adding to or removing from a cache in order to operate within the size limits of the caches, and at the same time, maintaining cache coherency/consistency between the caches at the agent side and client side such that printing can be successfully performed when deduplication is involved.

Figure 3:
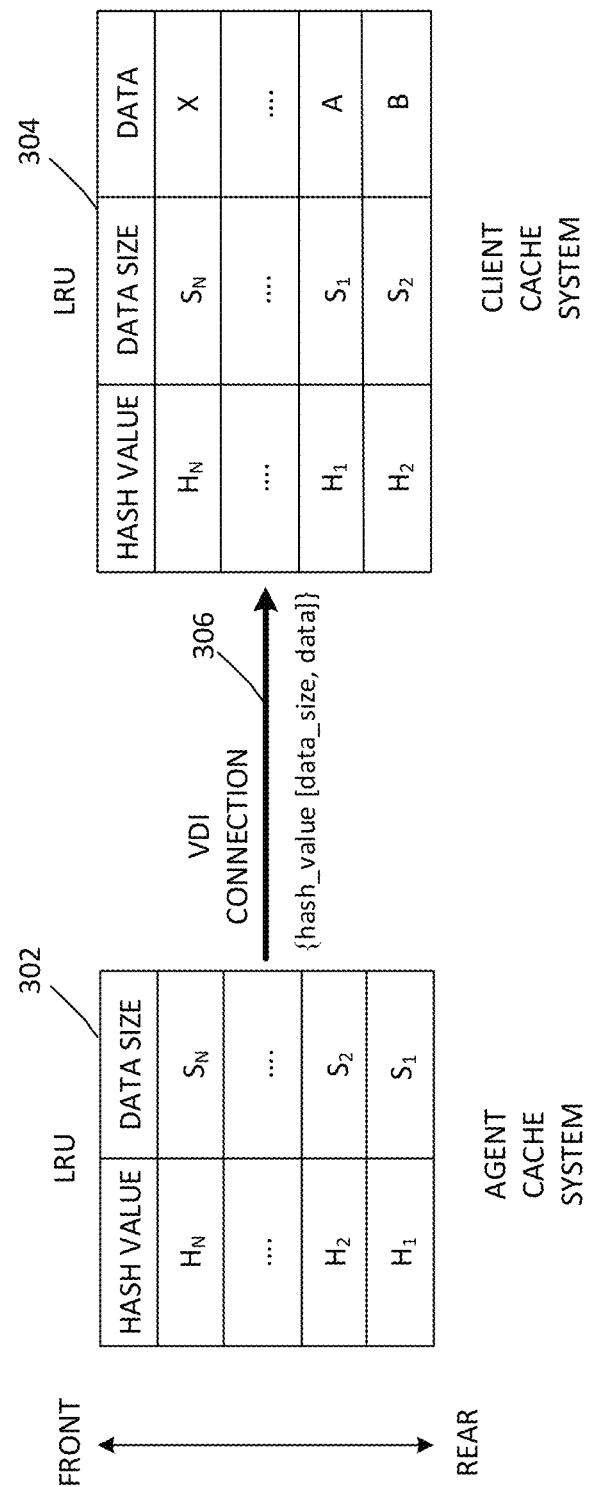
FIG. 3 is a diagram illustrating an example of a least recently used (LRU) caching technique for a printing process.

Some printing systems use a least recently used (LRU) caching technique in conjunction with performing the above-described processes of caching, hashing, and deduplication. The entries in the caches are organized as rows in a cache list, with each row in the cache list being referred to as a cache node. Thus, a hash value and its corresponding print data represent a single cache node. FIG. 3 is an example of one such LRU caching technique 300 for a printing process, and more particularly, FIG. 3 (as well as FIG. 4 thereafter) shows some of the drawbacks associated with the use of the LRU caching technique 300 for printing.

In FIG. 3, an agent cache system 302 just needs to cache (a) the fingerprints (hash values $H_1 \ldots H_N$) for the print data that is cached at a client cache system 304 and (b) the corresponding data size ($S_1 \ldots S_N$). The client cache system 304, in addition to storing the fingerprints and data sizes, also stores the corresponding actual print data (A, B, ... X) for printing and for later restoring deduped print data.

One cache row (cache node) of each cache system denotes one record in a cache list, which is organized like a queue in each cache system. Thus, when new data is being inserted into the cache list, the new data will be placed at the front node of the queue, and as each subsequent new data is placed into the cache list, the previously inserted data is moved from the front node towards the rear node of the queue. This process repeats until the queue/cache is full, such that when new data is to be inserted at the front node of the full cache, the data at the rear node of the cache is removed (e.g., is flushed out or deleted).

For new print data that has not yet been cached at the client cache system 304, the agent cache system 302 generates and sends a data structure {hash_value [data_size, data]} to the client cache system 304, with the brackets [ ] indicating that the data_size and data are unnecessary in a deduplication scenario. When deduplication is involved such that the agent cache system 302 determines that the same hash value is still cached at the agent side, the agent cache system 302 sends only the fingerprint in a data structure {hash_value} to the client cache system 304 instead of the actual print data, since the actual print data has already been previously sent to the client cache system 302. Thereafter, when the client cache system 304 receives the fingerprint (hash value), the client cache system 304 will use the hash value to try to restore/locate the previously cached print data, and send that print data to a print helper for printing at a physical printer.

As shown in FIG. 3, there is a specific sequence for the records in the queue at the agent cache system 302 (e.g., $H_1$, $H_2$, ... $H_N$), which represents an order of execution of respective print jobs for print data A, B, ... X. However, due to network latency in the VDI connection 306 between the agent cache system 302 and the client cache system 304, there is no guarantee that the same sequence will be present in the client cache system 302. For example, FIG. 3 shows that the sequence $H_2, H_1, \ldots H_N$ (B, A, ... X) in the client cache system 304 is now mismatched with the sequence in the agent cache system 302.

Figure 4:
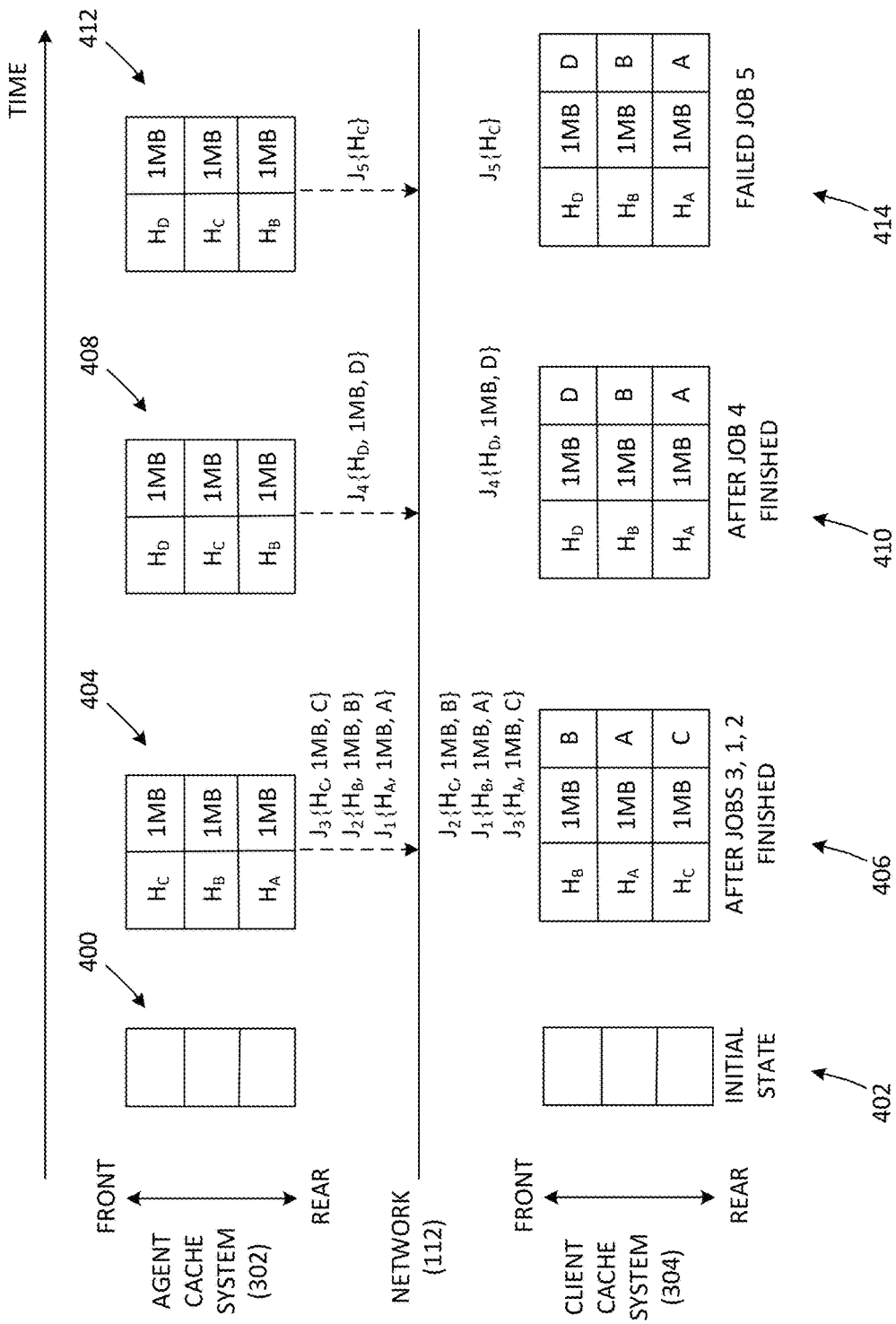
FIG. 4 is a diagram illustrating a further example of the LRU caching technique for a printing process.

FIG. 4 is a diagram illustrating a further example of the LRU caching technique for a printing process. More specifically, FIG. 4 shows how mismatched sequences at the agent cache system 302 and client cache system 304 results in failed print jobs when using the LRU technique.

In the example of FIG. 4, the maximum size of each cache system is assumed to be about 3 MB. There are five print jobs 1, 2, 3, 4, 5 that are issued by the agent cache system 302, and each print job contains print data A, B, C, D, C, respectively, Each data size is 1 MB, so the agent cache system 302 and the client cache system 304 just hold three entries of print data.

The sequence of the print jobs issued by the agent cache system 302 is 1, 2, 3, 4, 5. However, due to the latency in the physical network 112, the sequence arriving at the client cache system 304 is 3, 1, 2, 4, 5.

The initial states (empty) of the two cache systems are shown at 400 and 402. At 404, the agent cache system 302 receives print jobs 1, 2, and 3 in sequence from a virtual desktop; hashes the print data of each print job to obtain hash values $H_A$, $H_B$, and $H_C$, and determines that these hash values are not yet cached. So, the queue in the cache is populated respectively in sequence with the hash values $H_A$, $H_B$, and $H_C$, with $H_A$ being at the rear node and $H_C$ being at the front node of the cache. The agent cache system 302 also generates the corresponding data structures for the print jobs $J_1$, $J_2$, and $J_3$, and sends them to the client cache system 304 in sequence at 404. The data structures contain the hash values (H), data size, and print data for each print job (e.g., {hash_value data_size, data}={$H_A$, 1 MB, A} etc.).

Due to network latency, the client cache system 304 receives the print jobs in a different sequence ($J_3$, $J_1$, and $J_2$) than the sequence in which they were sent from the agent cache system 302, and so the queue in the client cache system 304 is correspondingly populated with the print data in the sequence of C, A, B (from the rear node to the front node) along with their corresponding hash values, as shown at 406. Thus, while the agent cache system 302 has the hash value $H_A$ at the rear node at 404, the client cache system 304 has a mismatched sequence having the hash value $H_C$ at the rear node at 406.

At 408, the agent cache system 302 receives the print job 4 ($J_4$); generates the hash value $H_D$ for the print job $J_4$; determines that the hash value $H_D$ is not yet cached, and so stores the hash value $H_D$ in the front node of the cache. Because the cache has a limit size of 3 MB, the least recently used hash value $H_A$ at the rear node of the cache is flushed out of the cache at 408. The agent cache system 302 then generates the data structure {$H_D$, 1 MB, D} for the print job $J_4$, and sends it to the client cache system 304.

At 410, the client cache system 304 receives the data structure {$H_D$, 1 MB, D} for the print job $J_4$, and stores the hash value $H_D$ and print data D at the front node of the cache. As a result, the least recently used hash value $H_C$ and corresponding print data C is flushed out from the rear node of the cache at 410, thereby leaving a sequence of print data D, B, A and their corresponding hash values, from the front node to the rear node at 410.

At 412, the agent cache system 302 receives print job 5 ($J_5$); hashes the print data C to generate the hash value $H_C$; and determines that the hash value $H_C$ is already cached (in the middle node of the cache). Accordingly, the agent cache system 302 generates a data structure {$H_C$} that only includes the hash value $H_C$ and does not include the actual duplicative print data C since the print data C was previously sent to the client cache system 304 (e.g., the agent cache system 302 performs deduplication at 412). The agent cache system 302 assumes that the client cache system 304 still has the print data C cached therein and that the client cache system 304 would then be able to use the hash value $H_C$ provided via in the data structure {$H_C$} to locate/restore the print data C. It is noted herein that in the cache management technique of FIG. 4, the contents of the agent cache system 302 at 412 remains unchanged (e.g., maintains the same contents and sequence as that shown at 408) when deduplication is performed. In other cache management techniques, the duplicate hash value $H_C$ is written into the front node, the previously cached hash value $H_C$ at the middle node is deleted, and the hash value $H_D$ at the front node is shifted downwards to the middle node.

Despite the assumption by the agent side that the print data C is still cached at the client side, and as shown previously at 410, the client cache system 302 has actually previously removed the print data C and its hash value $H_C$ from the cache. Thus, when the client cache system 304 receives the print job $J_5$ that specifies only the hash value $H_C$, the client cache system 304 will have no previous record of this hash value $H_C$ and its corresponding print data C. Accordingly, since the client cache system 304 will therefore be unable to locate/restore the print data C, the print job $J_5$ will fail at 414.

VLRU Method

To address the foregoing and other issues with LRU techniques, the various embodiments of the VLRU method described herein, as a baseline, improve the chances for deduplicated print data to be more consistently located/restored at the client side for printing. Moreover, the VLRU method provides a high-performance technique without introducing undue time-consuming complexity to the cache management, thereby preserving a primary purpose (e.g., improving efficiency/performance) of caches. The caches at the agent side and client side remain consistent/coherent with each other, despite the fact that network latency may cause the sequences at the two caches to be out-of-sequence with respect to each other—the VLRU method does not require the two sequences in the caches to be the same.

Figure 5:
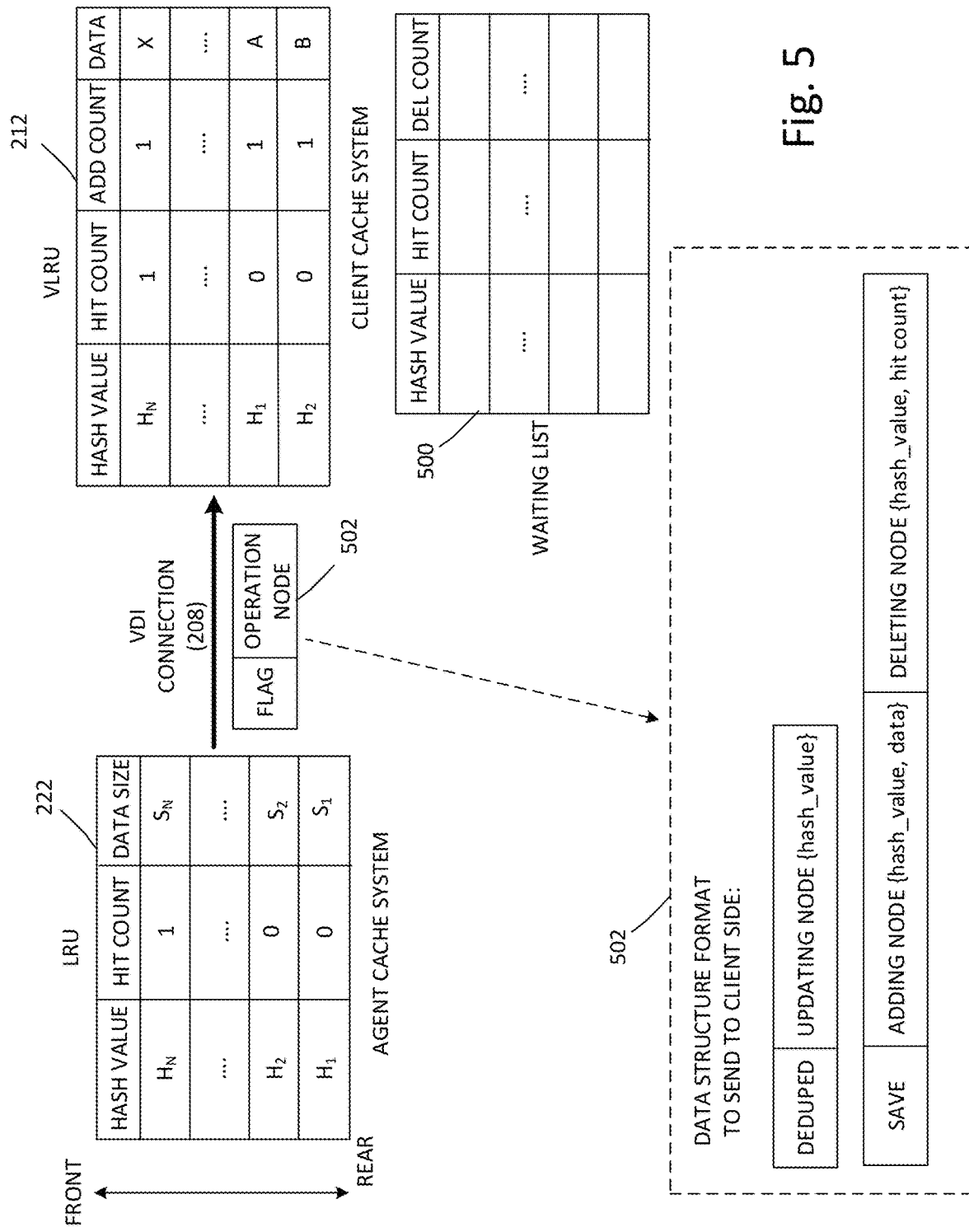
FIG. 5 is a diagram illustrating an example of a varied LRU (VLRU) caching technique for a printing process for the client and agent devices and printers of FIG. 2.

FIG. 5 is a diagram illustrating an example of a varied LRU (VLRU) caching technique for a printing process for the client and agent devices and printers of FIG. 2. In the example of FIG. 5 and the subsequent figures, the caching at the agent side continues to use an LRU caching technique similar to that described above with respect to FIGS. 3 and 4 for purposes of adding and removing cache entries, but with some differences (as will be described next) in the contents/arrangement of the agent cache system 222 and the content/format of the data structures sent to the client cache system 212. The client side uses the VLRU caching technique for the client cache system 212, in a manner that based on an operation node (described next below) received from the agent side, the deduped data at the agent side can be located/restored at the client side for printing.

In the VLRU caching technique, the size of the cache at the client cache system 212 is made greater than or equal to the size of the cache at the agent cache system 222. That is, the client cache system 212 can have more cache nodes (store more print data) than the maximum number of cache nodes at the agent cache system 222, when appropriate and for a limited period of time. This ensures that deduped print data can be recovered at the client side and not lost. Moreover, a waiting list 500 is provided in the client cache system 212 or elsewhere at the client side, for use in storing hash values of print data that are being delayed/postponed in their deletion, so as to again ensure that the print data is available at the client side for restoration if/when deduplication is performed at the agent side for that print data.

As shown in FIG. 5, an additional column (hit count) is added to the agent cache system 222, in addition to columns for the hash value H and data size S for each cache node (cache row). The hit count represents a number of times that there is a hit for a cached hash value of print data, when a deduplication is performed. The hit count for newly inserted hash values of print data is zero, and when there is a hit for the hash values when determining whether to perform deduplication, the hit count is incremented by one.

The format of data structures 502 sent from the agent side to the client side (via the VDI connection 208) includes a flag and information about the operation node. More specifically, the flag identifies the three types of operations that may be performed on the cache nodes at the agent cache system 222: updating node (e.g., deduplication), adding node (e.g., adding a new entry to the front node), and deleting node (e.g., flushing a cache entry from the rear node). As shown in FIG. 5, the data structures 502 include: a DEDUPED flag and hash value for an updating node; a SAVE flag, hash value, and print data for an adding node, along with a hash value and hit count for a deleting node that is being deleted when the adding node is added at the agent side.

The data structures 502 from the agent side are parsed at the client side, such that that the client cache system 212 includes, for each cache node (row), columns for a hash value, hit count, add count, and print data. The waiting list 500 includes, for each cache node stored in the waiting list 500, columns for the hash value, hit count, and a delete count.

Figure 6:
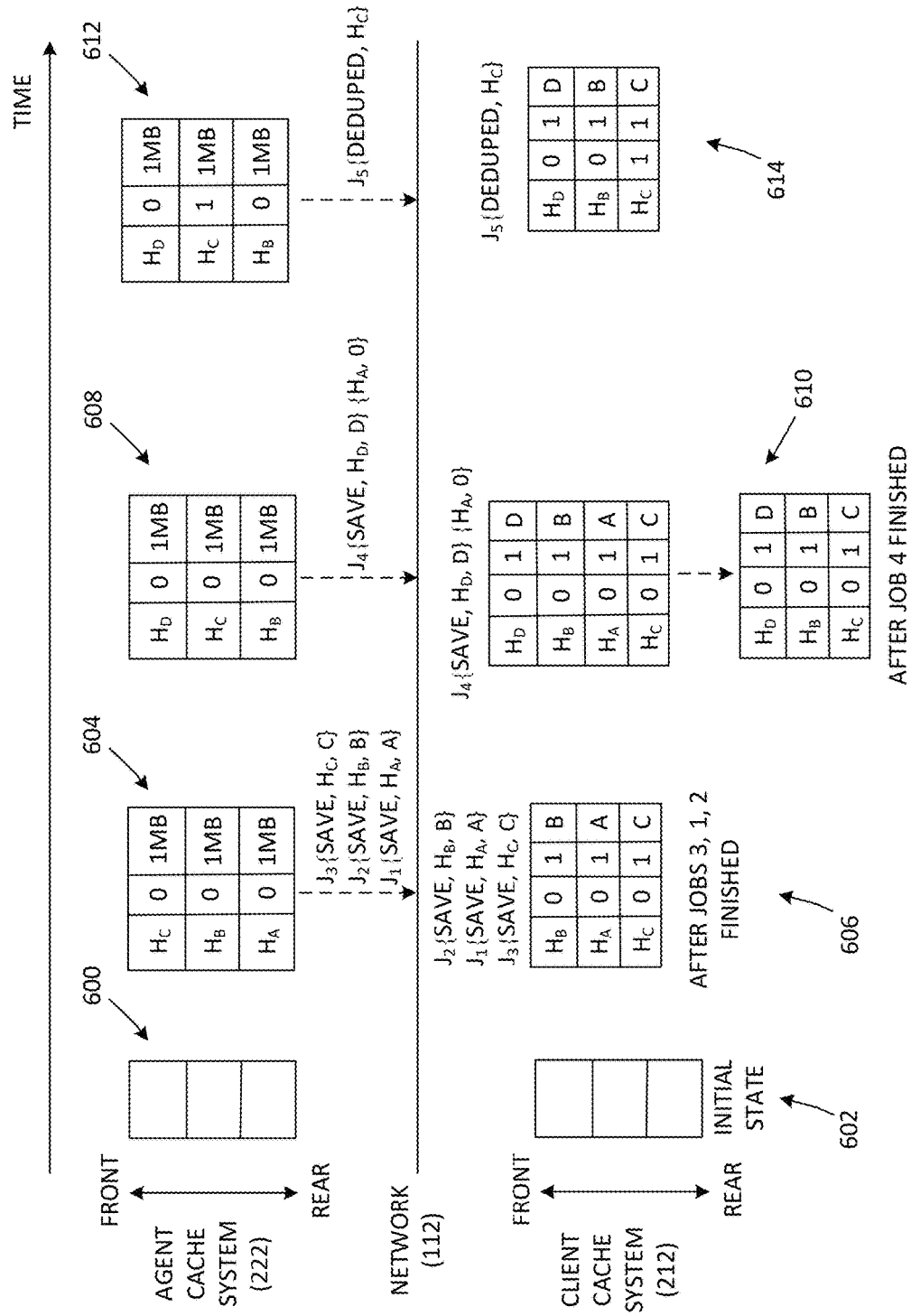
FIG. 6 is a diagram illustrating a further example of the VLRU caching technique for a printing process for the client and agent devices and printers of FIG. 2.
Figure 7:
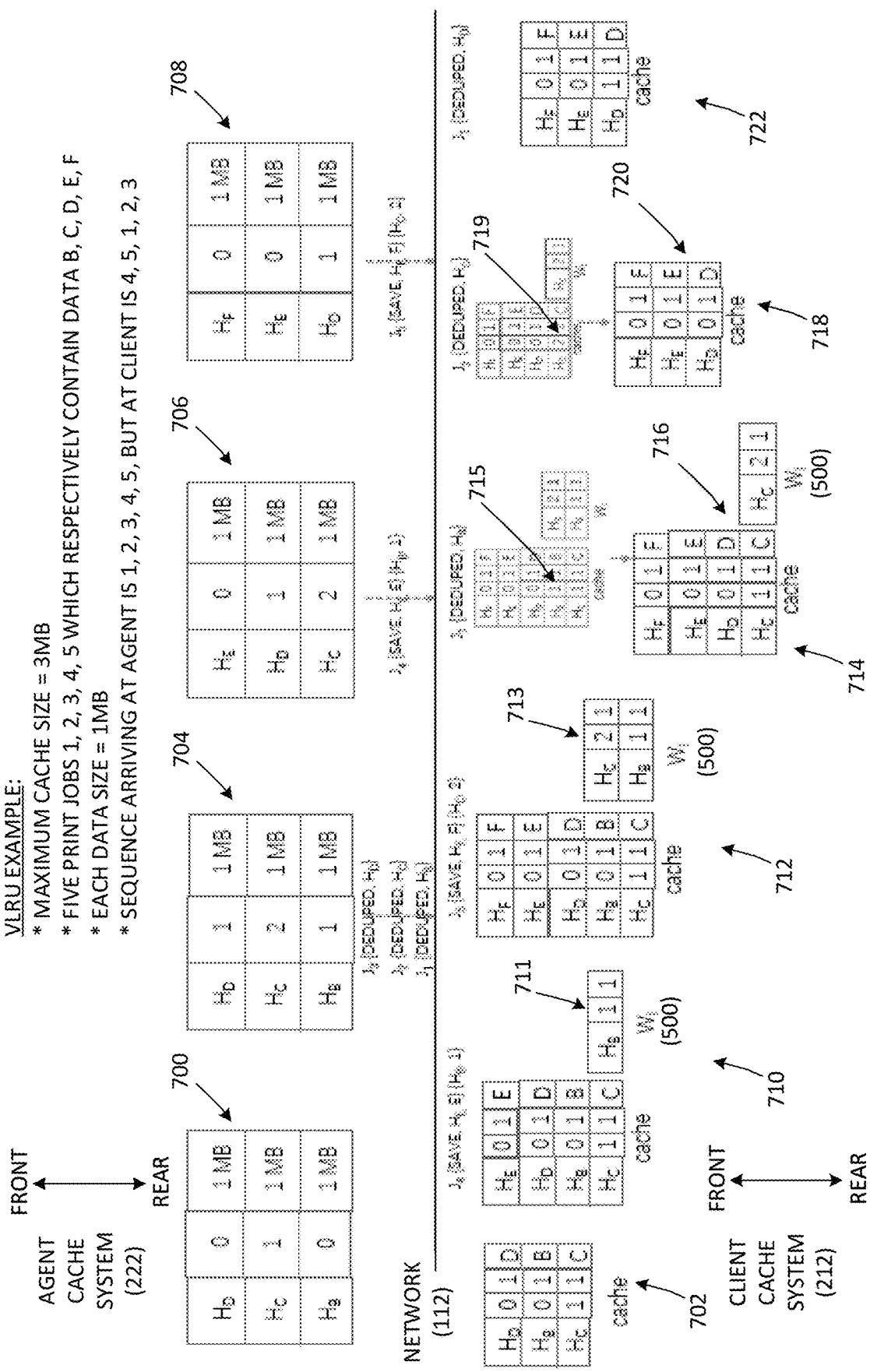
FIG. 7 is a diagram illustrating another example of the VLRU caching technique for a printing process for the client and agent devices and printers of FIG. 2.

FIGS. 6 and 7 illustrate how at least some of the features of FIG. 5 are used. Reference is first made to FIG. 6, which is a diagram illustrating a further example of the VLRU caching technique for a printing process for the client and agent devices and printers of FIG. 2. The example of FIG. 6 has some similar assumptions/parameters as the previous example above in FIG. 4. Specifically: the maximum size of the agent cache system 222 is assumed to be about 3 MB; there are five print jobs 1, 2, 3, 4, 5 that are received by the agent cache system 222 from the virtual desktop 126; each print job contains print data A, B, C, D, C, respectively; and each data size is 1 MB, such that the agent cache system 222 is able to hold three entries of print data. The client cache system 212 in this example can hold more than three entries (more than 3 MB of print data for a period of time. The sequence of the print jobs sent by the agent cache system 222 is 1, 2, 3, 4, 5. However, due to the latency in the physical network 112, the sequence arriving at the client cache system 212 is 3, 1, 2, 4, 5.

The initial states (empty) of the two cache systems are shown at 600 and 602. At 604, the agent cache system 222 receives print jobs 1, 2, and 3 in sequence; hashes the print data of each print job to obtain hash values $H_A$, $H_B$, and $H_C$, and determines that these hash values are not yet cached. So, the queue in the cache is populated respectively in sequence with the hash values $H_A$, $H_B$, and $H_C$, with $H_A$ being at the rear node and $H_C$ being at the front node of the cache. These are thus adding nodes. The hit count for each cache node is 0 at this stage. The agent cache system 222 also generates the corresponding data structures for the print jobs $J_1$, $J_2$, and $J_3$ which include the SAVE flag for these adding nodes, and sends the data structures to the client cache system 212 in sequence at 604. The data structures contain the flag (SAVE), hash values (H), and print data for each adding node in the print job (e.g., {SAVE, $H_A$, A} etc.).

Due to network latency, the client cache system 212 receives the print jobs in a different sequence ($J_3$, $J_1$, and $J_2$) that that in which they were sent from the agent side, and so the queue in the client cache system 212 is correspondingly populated with the print data in the sequence of C, A, B (from the rear node to the front node) along with their corresponding hash values (0 each), as shown at 606. Moreover, since these are adding nodes, the column for the add count is incremented to 1 at 606. Thus and also as shown at 606, after print jobs 1, 2, and 3 are completed at the client side, there is a mismatched sequence of caches at the client side and agent side.

At 608, the agent cache system 222 receives the print job 4 ($J_4$); generates the hash value $H_D$ for the print job $J_4$; determines that the hash value $H_D$ is not yet cached, and so stores the hash value $H_D$ in the front node of the cache. Because the cache has a limit size of 3 MB, the least recently used hash value $H_A$ at the rear node of the cache is flushed out of the cache. The agent cache system 222 then generates, for the print job $J_4$, the data structure {SAVE, $H_D$, D} for the adding node and {hash_value, hit count} (specifically, {$H_A$, 0}) for the deleting node, and sends this to the client cache system 212.

At 610, the client cache system 212 receives the data structure {SAVE, $H_D$, D} {$H_A$, 0} for the print job $J_4$, and stores the hash value $H_D$, hit count, add count, and print data D at the front node of the cache in accordance with executing the SAVE operation for the print data A. Hence, the cache now has four nodes for a period of time, and then later three nodes after the delete operation is executed for the cache node for print data A, as shown at 610 after print job 4 is completed. It is therefore noted that the print data C (and is corresponding hash value) was not flushed from the cache at 610, since the cache node for print data A was deleted.

At 612, the agent cache system 222 receives print job 5 ($J_5$); hashes the print data C to generate the hash value $H_C$; and determines that the hash value $H_C$ is already cached (in the middle node of the cache). Accordingly, the agent cache system 612 generates a data structure {DEDUPED, $H_C$} that only includes the hash value $H_C$ and does not include the actual duplicative print data C since the print data C was previously sent to the client cache system 212 (e.g., the agent cache system 222 performs deduplication at 612). The agent cache system 222 also increments the hit count for the hash value $H_C$ from 0 to 1 at 612. The client cache system 614 receives the data structure {DEDUPED, $H_C$} at 614, and is able to successfully use the hash value $H_C$ to locate the print data C at the rear node of the cache. Thus, the print data C can thereafter be sent to the physical printer(s) for printing.

Reference is made next to FIG. 7, which is a diagram illustrating another example of the VLRU caching technique for a printing process for the client and agent devices and printers of FIG. 2. More specifically, FIG. 7 shows how the waiting list 500 (denoted as $W_L$) may be used to ensure that print data deduplicated at the agent side remains available at the client side.

In the example of FIG. 7: the maximum size of the agent cache system 222 is assumed to be about 3 MB; there are five print jobs 1, 2, 3, 4, 5 that are received by the agent cache system 222 from the virtual desktop 126; each print job contains print data B, C, D, E, F, respectively; and each data size is 1 MB, such that the agent cache system 222 is able to hold three entries of print data. The client cache system 212 in this example can hold more than three entries (more than 3 MB of print data) for a period of time. The sequence of the print jobs sent by the agent cache system 222 is 1, 2, 3, 4, 5. However, due to the latency in the physical network 112, the sequence arriving at the client cache system 212 is 4, 5, 1, 2, 3.

The initial cache states (entries at each cache node) of the two cache systems are shown at 700 and 702, which correspond to the cache states at the end of the printing process previously depicted in FIG. 6. At 704, the agent cache system 222 receives print jobs 1, 2, and 3 in sequence; hashes the print data of each print job to obtain respective hash values $H_B$, $H_C$, and $H_D$, and determines that these hash values are already cached. That is, there is a cache hit for each of these hash values. Hence, their respective hit counts are incremented by 1 at 704 (e.g., the hit count for $H_B$ is incremented from 0 to 1, the hit count for $H_C$ is incremented from 1 to 2, etc.). Because the hash values are found in the cache, the agent cache system 222 does not need to resend the same corresponding print data to the client side (e.g., performs deduplication) and instead generates data structures corresponding to updating nodes, in accordance with the format of the data structure 502 shown in FIG. 5. Hence, the generated data structures for the three updating nodes are: {DEDUPED, $H_B$}, {DEDUPED, $H_C$}, and {DEDUPED, $H_D$}, and these are sent to the client side in this sequence.

Next at 706, the agent cache system 222 determines that the hash value $H_E$ for print job 4 does not exist in the cache. As such, the hash value $H_E$ and its hop count (0) form an adding node that is written to the front node of the cache at 706. The hash value $H_B$ that was at the rear node at 704 is thus flushed (e.g., becomes a deleting node) at 706 in order to make room in the cache for the adding node. The agent cache system 222 then generates the appropriate data structure to send to the client side, so as to inform the client side of the adding node and the corresponding deleting node: {SAVE, $H_E$, E} {$H_B$, 1}.

A similar process occurs next at 708, wherein the agent cache system 222 determines that the hash value $H_F$ for print job 5 does not exist in the cache. As such, the hash value $H_F$ and its hop count (0) form an adding node that is written to the front node of the cache at 708. The hash value $H_C$ that was at the rear node at 706 is thus flushed (e.g., becomes a deleting node) at 708 in order to make room in the cache for the adding node. The agent cache system 222 then generates the appropriate data structure to send to the client side, so as to inform the client side of the adding node and the corresponding deleting node: {SAVE, $H_F$, F} {$H_C$, 2}.

Due to latency in the physical network 112, the above data structures do not arrive at the client side in the same sequence in which they were sent from the agent side. That is, the sequence arriving at the client side is print jobs 4, 5, 1, 2, 3, instead of print jobs 1, 2, 3, 4, 5.

Print job 4 is received first at 710 at the client side, with the data structure {SAVE, $H_E$, E} {$H_B$, 1}. A cache node (adding node) is created at the front node of the cache to store the hash value $H_E$, the hit count 0, and the print data E, as well as adding 1 to the add count column to indicate that this is a newly added cache node. There are thus four cache nodes at 710, after the completion of print job 4 to print data E. The deleting node (corresponding to {$H_B$, 1}) is not yet deleted from the cache and is instead placed in the waiting list $W_I$ at 710, with the delete count set to 1 and the hit count in the waiting list $W_I$ also at 1 (shown at 711). Note here that the hit count for the hash value $H_B$ remains at 0 in the cache.

Print job 5 is received next at 712 at the client side, with the data structure {SAVE, $H_F$, F} {$H_C$, 2}. A cache node (adding node) is created at the front node of the cache to store the hash value $H_F$, the hit count 0, and the print data F, as well as adding 1 to the add count column to indicate that this is a newly added cache node. There are thus now five cache nodes at 712, after the completion of print job 5 to print data F. The deleting node (corresponding to {$H_C$, 2}) is not yet deleted from the cache and is instead placed in the waiting list $W_I$ at 712, with the delete count set to 1 and the hit count in the waiting list $W_I$ at 2 (shown at 713). Note here that the hit count for the hash value $H_C$ remains at 1 in the cache.

Print job 1 is received next at 714 at the client side, with the data structure {DEDUPED, $H_B$}. As a result, the hit count for the hash value $H_B$ is incremented (shown at 715) from 0 to 1 in the cache, thereby matching the hit count 1 for the hash value $H_B$ in the waiting list $W_I$ (and also matching delete and add counts that are both at 1), which are conditions that trigger deletion of hash value $H_B$ from the cache and waiting list $W_I$. The print data B is printed to complete print job 1 at 714, and the cache is updated (shown at 716) to execute the delete operation previously received at 710, thereby removing the hash value $H_B$ from the cache and waiting list $W_I$ at 714.

A similar process is performed next at 718, when print job 2 is received at the client side, with the data structure {DEDUPED, $H_C$}. The hit count for the hash value $H_C$ is incremented (shown at 719) from 1 to 2 in the cache, thereby matching the hit count 2 for the hash value $H_C$ in the waiting list $W_I$ (and also matching delete and add counts that are both at 1), which are conditions that trigger deletion of hash value $H_C$ from the cache and waiting list $W_I$. The print data C is printed to complete print job 2 at 718, and the cache is updated (shown at 720) to execute the delete operation previously received at 712, thereby removing the hash value $H_C$ from the cache and waiting list $W_I$ at 718. The wait list $W_I$ is empty at this point (e.g., no more entries awaiting deletion).

Print job 3 is received next at 722 at the client side, with the data structure {DEDUPED, $H_D$}. The hit count for the hash value $H_D$ is updated from 0 to 1 at 722, and the print data D is located and sent to the physical printer for printing, thereby completing print job 3 at 722.

Figure 8:
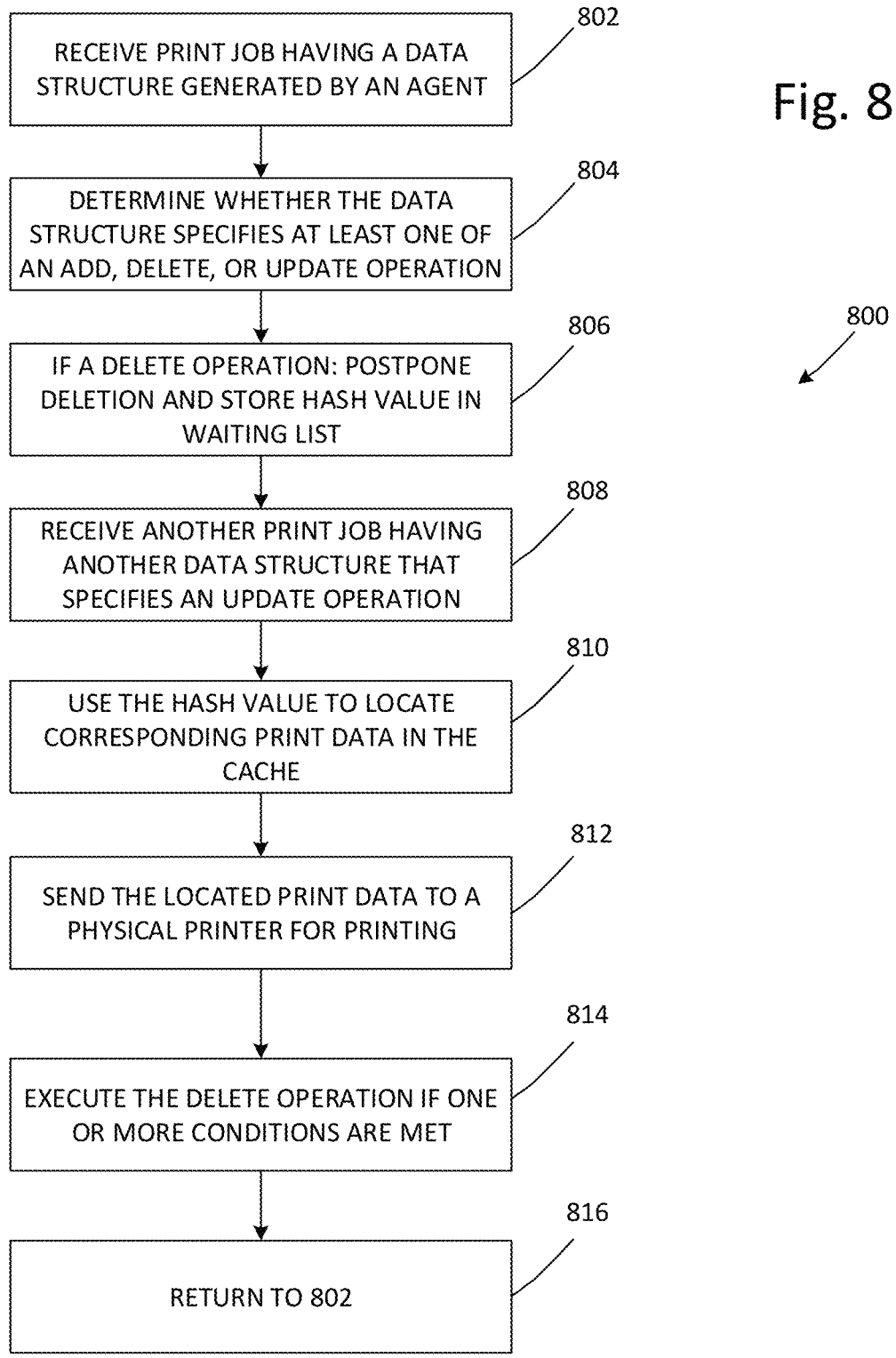
FIG. 8 is flowchart of an example method to perform the VLRU caching technique in the virtualized computing environment of FIG. 1.

FIG. 8 is a flowchart of an example method 800 to perform the VLRU caching technique in the virtualized computing environment 100 of FIG. 1, such as the VLRU caching technique performed in the previous FIGS. 5-7. Example method 800 may include one or more operations, functions, or actions illustrated by one or more blocks, such as blocks 802 to 816. The various blocks of the method 800 and/or of any other process(es) described herein may be combined into fewer blocks, divided into additional blocks, supplemented with further blocks, and/or eliminated based upon the desired implementation. In one embodiment, the operations of the method 800 and/or of any other process(es) described herein may be performed in a pipelined sequential manner. In other embodiments, some operations may be performed out-of-order, in parallel, etc.

According to one embodiment, the method 800 may be performed by the user device 146 and its client-side elements shown in FIGS. 2 and 5-7, in cooperation with the agent-side elements shown in FIGS. 2 and 5-7. In other embodiments, various other elements in a computing environment may perform, individually or cooperatively, the various operations of the method 800.

At a block 802, the client cache system 212 receives a print job J from the agent. The print job includes a data structure like shown in FIG. 5 that species at least one type of operation to be performed for a cache node at the client, a hash value corresponding to print data at the cache node, and/or other information (such as hit count).

The block 802 may be followed by a block 804 wherein the client cache system 212 reads the data structure in the print job and determines whether the data structure specifies at least one of an add (SAVE), delete, or update (DEDUPED) operation. If the operation is determined to be a delete operation at a block 806, the deletion of the cache node specified in the data structure is postponed. For instance, the hash value (and its accompanying data such as the hit count and delete count) are stored in the waiting list 500, so as to enable the client to subsequently use the hash value to locate the print data in the cache for printing (if another print job is later received that requires the printing of that print data).

The block 806 may be followed by a block 808 wherein the client cache system 212 receives another print job having another data structure that species an update operation. For example, this print job provides the hash value of print data that has been deduplicated at the agent. As such, the client cache system 212 now has to use (at a block 810) that hash value to attempt to locate/restore the print data for printing at the physical printer(s) at the client side.

Because the client cache system 212 has postponed the deletion of the print data (back at the block 806), the client cache system 212 is able to successfully use the hash value at the block 810 to locate/restore the print data. At a block 812, the client cache system 212 sends the print data to the physical printer(s) for printing.

The block 812 may be followed by a block 814 wherein the client cache system 212 executes the delete operation (received at the block 802) in order to delete the cache node from either or both the cache or the waiting list 500, if one or more conditions are met. The method 800 then proceeds to block 816 so as to return to the block 802 to await the next print job(s). Further details of the update operation, add operation, and delete operation, and applicable conditions for their execution, as explained for FIG. 8, will be provided next with respect to FIGS. 9-11.

Figure 9:
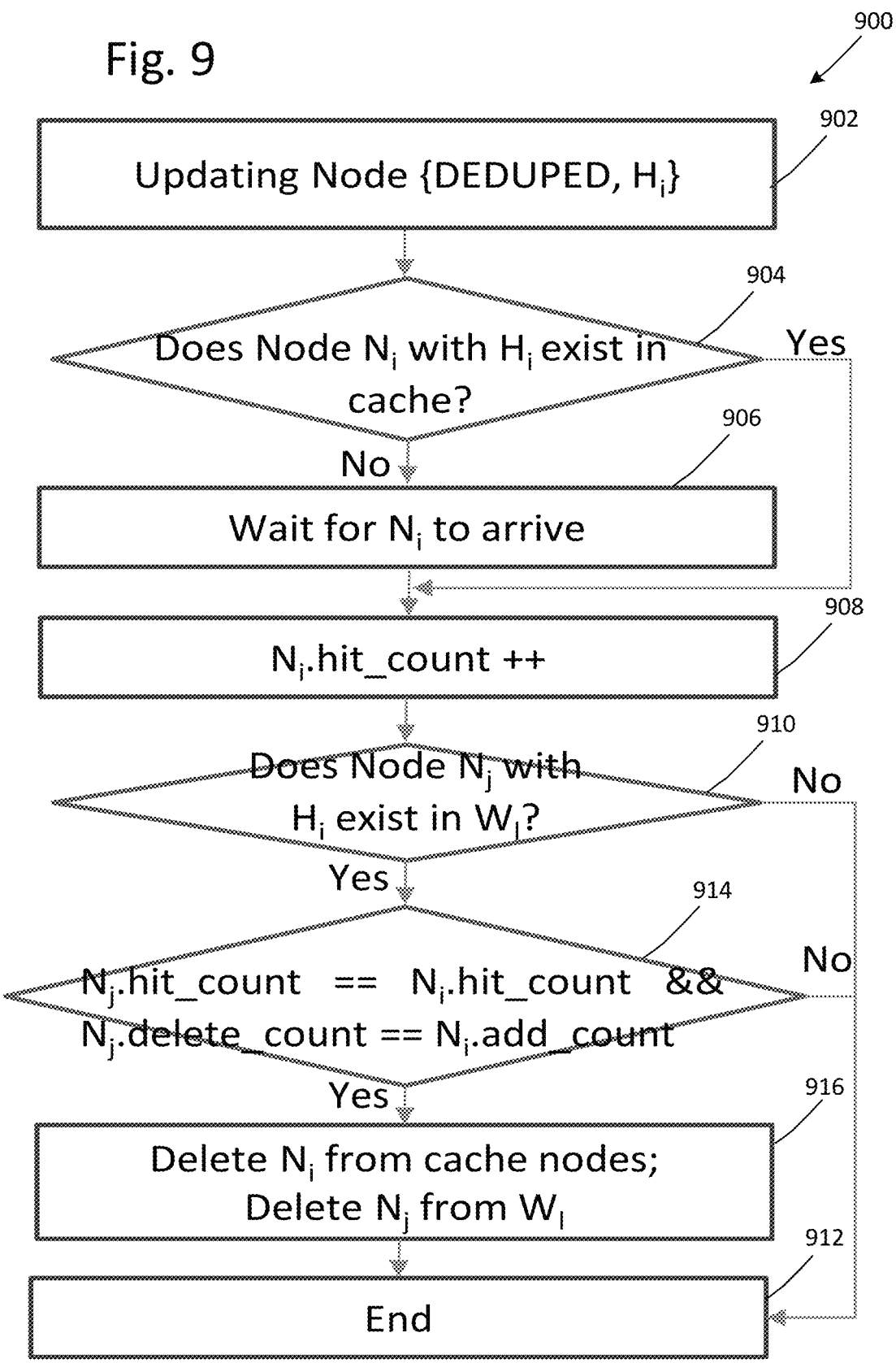
FIG. 9 is a flowchart of an example method associated with an updating node (deduplication) for the VLRU caching technique of FIG. 8.

Specifically, FIG. 9 is a flowchart of an example method 900 associated with an updating node (deduplication) for the VLRU caching technique of FIG. 8, and which may be performed by the client cache system 212 at the client side. At a block 902, the client cache system 212 receives a data structure from the agent, for example in the form of {DEDUPED, $H_i$} for a cache node at the agent side having a hash value $H_i$ cached therein and for which the agent has sent only the hash value (and not the print data) due to deduplication performed at the agent.

At a block 904, the client cache system 212 checks whether there a cache node $N_i$ exists in its cache that contains the hash value $H_i$. If the cache node $N_i$ does not exist ("NO" at the block 904), then the client cache system 212 waits for the cache node $N_i$ (the print data) to arrive (via an adding node instruction from the agent side) at a block 906.

If the cache node $N_i$ does exist in the cache ("YES" at the block 904), then the method 900 moves to a block 908 wherein the hit count for the cache node is incremented by 1 in the cache, such as shown at 715 and 719 in FIG. 7. Next at a block 910, the client cache system 212 checks the waiting list $W_I$ to determine whether a cache node $N_j$ having the hash value $H_i$ exists in the waiting list $W_I$. If the cache node $N_j$ does not exist in the waiting list $W_I$ ("NO" at the block 910), then the method 900 proceeds to a block 912, wherein the print data at the cache node $N_i$ is sent to the physical printer for printing and the method 900 ends.

On the other hand, if the cache node $N_j$ is determined to exist in the waiting list $W_I$ ("YES" at the block 910), then the method 900 proceeds to a block 914 to evaluate whether one or more conditions are met. For example at the block 914, the client cache system 212 determines (1) whether the hit count for the cache node $N_j$ in the waiting list $W_I$ is equal to the hit count for the cache node $N_i$ in the cache, and (2) whether the delete count for the cache node $N_j$ in the waiting list $W_I$ is equal to the add count for the cache node $N_i$ in the cache. If these conditions are not met ("NO" at the block 914), then the method 900 proceeds to the block 912, wherein the print data at the cache node $N_i$ is sent to the physical printer for printing and the method 900 ends.

However, if the conditions are met ("YES" at the block 914), then the method 900 proceeds to a block 916 wherein the cache node $N_i$ is deleted from the cache and the cache node $N_j$ is deleted from the waiting list $W_I$. The print data for the cache node $N_J$ is sent to the physical printer and the method ends at 912.

Figure 10:
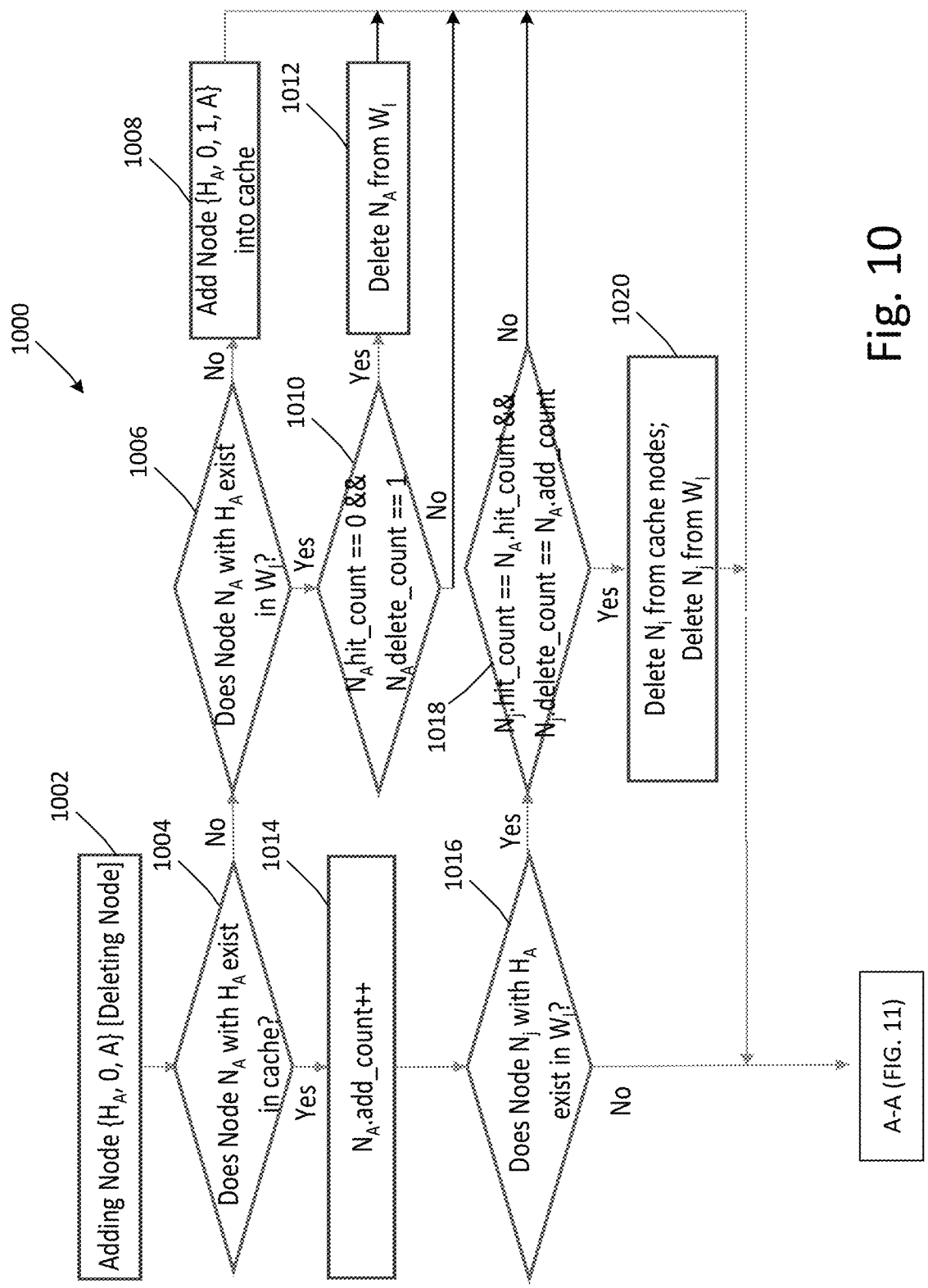
FIG. 10 is a flowchart of an example method associated with an adding node for the VLRU caching technique of FIG. 8.
Figure 11:
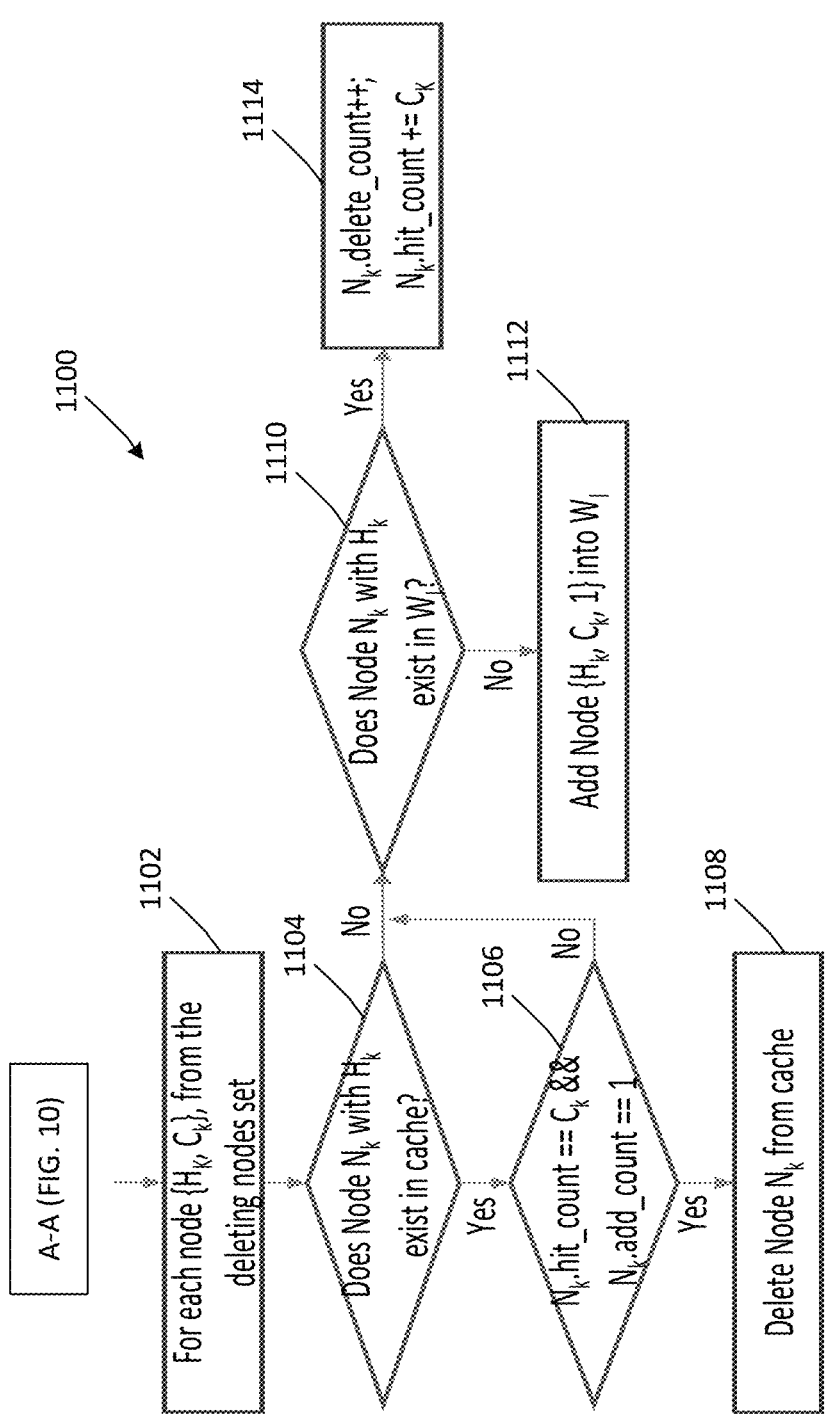
FIG. 11 is a flowchart of an example method associated with a deleting node for the VLRU caching technique of FIG. 8.

Next are FIGS. 10 and 11 which may be viewed in tandem regarding an add operation (to insert an adding node in a cache), in combination with a delete operation (to correspondingly delete a deleting node from a cache) which is performed if the cache is full and not performed if the cache is not full.

Referring first to FIG. 10, which is a flowchart of an example method 1000 associated with an adding node for the VLRU caching technique of FIG. 8, the method 1000 may be performed by the client cache system 212 at the client side. At a block 1002, the client cache system 212 receives the data structure for an adding node, with or without (represented by brackets [ ]) the data structure for one or more deleting nodes in a deleting node set. The data structure {$H_A$, 0, A} provides the hash value $H_A$, the hit count 0 for a newly added cache node, and the print data A.

At a block 1004, the client cache system 212 determines whether a cache node $N_A$ having the print data A already exists in the cache at the client side. If the cache node $N_A$ already exists in the cache ("YES" at the block 1004), then the method 1000 proceeds to a block 1014 to increment (by 1) the add count in the cache for the cache node $N_A$. The method 1000 then proceeds to a block 1016 to determine whether a cache node $N_j$ with the hash value $H_A$ exists in the waiting list $W_I$. If the cache node $N_j$ does not exist in the waiting list $W_I$ ("NO" at the block 1016), then the print data A at the cache node $N_A$ is sent to the physical printer for printing (if there are no further deletion operations to be performed), else the method 1000 continues in FIG. 11 with a method 1100 (flowchart continuity shown at point A-A in FIG. 10) to perform the removal of deleting nodes.

If, back at the block 1004, the client cache system 212 determines that the cache node $N_A$ does not exist in the cache ("NO" at the block 1004), then the method 1000 proceeds to a block 1006 to determine whether the cache node $N_A$ with the hash value $H_A$ exists in the waiting list $W_I$. If the cache node $N_A$ with the hash value $H_A$ does not exist in the waiting list $W_I$ ("NO" at the block 1004), then the cache node $N_A$ is added to the cache at a block 1008, including the hash value $H_A$, the hit count 0, the add count 1, and the print data A. Else, if the cache node $N_A$ with the hash value $H_A$ does exist in the waiting list $W_I$ ("YES" at the block 1004), then the method 1000 proceeds to a block 1010 to determine whether one or more conditions are met.

For example at the block 1010, the client cache system 212 determines (1) whether the hit count for the cache node $N_A$ in the waiting list $W_I$ is equal to 0, and (2) whether the delete count for the cache node $N_A$ in the waiting list $W_I$ is equal to 1. If these conditions are not met ("NO" at the block 1010), then the method 900 proceeds to point A-A for printing of the print data A or deletion of deleting nodes (described in FIG. 11). If, however, these conditions are met ("YES" at the block 1010), then the method 1000 proceeds to a block 1012 to delete the cache node $N_A$ in the waiting list $W_I$, and the method 1000 proceeds to the point A-A for printing of the print data A or deletion of deleting nodes (described in FIG. 11).

If, back at the block 1016, the client cache system 212 determines that the cache node $N_j$ with the hash value $H_A$ exists in the waiting list $W_I$ ("YES" at the block 1016), then the method 1000 proceeds to a block 1018 to determine whether one or more conditions are met. For example at the block 1018, the client cache system 212 determines (1) whether the hit count for the cache node $N_j$ in the waiting list $W_I$ is equal to the hit count for the cache node $N_A$ in the cache, and (2) whether the delete count for the cache node $N_j$ in the waiting list $W_I$ is equal to the add count for the cache node $N_A$ in the cache. If these conditions are not met ("NO" at the block 1018), then the method 1000 proceeds to point A-A to print the data A or to execute deletion operations to delete deleting nodes (described in FIG. 11). However, if the conditions are met ("YES" at the block 1018), then the method 1000 proceeds to a block 1020 wherein the cache node $N_i$ is deleted from the cache and the cache node $N_j$ is deleted from the waiting list $W_I$, and then the method 1000 proceeds to point A-A to print the data A or to execute deletion operations to delete deleting nodes (described in FIG. 11).

Referring next to FIG. 11, which is a flowchart of an example method 1100 associated with a deleting node for the VLRU caching technique of FIG. 8 and which continues at point A-A from FIG. 10, the method 1100 may be performed by the client cache system 212 at the client side.

After the adding node is processed by the method 1000 shown in FIG. 10, the method 1100 starts at block 1102 to go through each deleting node $N_k$, one by one, in the deleting nodes set (contained in the data structure at the block 1002 in FIG. 10). Each deleting node $N_k$ at the block 1102 includes a hash value $H_k$ and a current hit count $C_k$ (e.g., $\{H_k, C_k\}$) as received from the agent.

At a block 1104, the client cache system 212 determines whether the deleting node $N_k$ with a hash value $H_k$ exist in the cache. If the deleting node $N_k$ exists in the cache ("YES" at the block 1104), then the method 1100 proceeds to a block 1106 to determine whether one or more conditions are met. For example at the block 1106, the client cache system 212 determines (1) whether the hit count for the deleting node $N_k$ in the cache is equal to the hit count $C_k$ as received from the agent, and (2) whether the add count for the deleting node $N_k$ in the cache is equal to 1. If these conditions are met ("YES" at the block 1106), then the method 1100 proceeds to a block 1108 to the delete the deleting node $N_k$ from the cache.

However, if the conditions are not met ("NO" at the block 1106) or if the deleting node $N_k$ does not exist in the cache ("NO" back at the block 1104), then the method 1100 proceeds to a block 1110 to postpone the deletion of the deleting node $N_k$, by first determining whether the deleting node $N_k$ exists in the waiting list $W_I$. If the deleting node $N_k$ does not exist in the waiting list $W_I$ ("NO" at the block 1110), then the method 1100 proceeds to a block 1112 wherein the deleting node $N_k$ is added in the waiting list $W_I$, specifically the hash value, hit count as received from the agent, and the deleting count of 1 are inserted as $\{H_k, C_k, 1\}$ into the waiting list $W_I$ at the block 1112. If, back at the block 1110, the deleting node $N_k$ does exist in the waiting list $W_I$ ("YES" at the block 1110), then the method 1100 proceeds to a block 1114, wherein the delete count for the deleting node $N_k$ in the waiting list $W_I$ is incremented by 1, and the hit count for the deleting node $N_k$ in the waiting list $W_I$ is incremented so as to be equal to the current hit count $C_k$ as received from the agent. The method 1100 then proceeds to repeat the process the next deleting node in the deleting node set, in accordance with the blocks 1102-1114 above.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1-11. For example, computing devices capable of acting as agent-side host devices or client-side user devices may be deployed in or otherwise operate in conjunction with the virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances (VCIs) may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to ensure that deduped data is available at a client for printing.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method performed by a client to process print jobs that originate from an agent having at least one virtual printer, the method comprising:
    receiving a print job having a data structure generated by the agent, wherein the data structure specifies at least one of an update operation, an add operation, or a delete operation to be performed for a cache node at a cache at the client, and wherein the data structure further specifies a hash value corresponding to print data at the cache node;
    reading the data structure in the print job;
    in response to determining that the data structure specifies the delete operation, postponing deletion of the print data from the cache node by storing the hash value corresponding to the print data in a waiting list at the client, wherein postponing the deletion of the print data from the cache node enables the client to subsequently locate the print data in the cache for printing at a physical printer of the client; and
    in response to receiving, after receiving the print job having the data structure that specifies the delete operation, another print job having another data structure that specifies the update operation which indicates that the agent has performed a deduplication process for the print data corresponding to the hash value:
        locating the print data in the cache using the hash value;
        sending the located print data to the physical printer for printing; and
        executing the delete operation to delete the print data from at least one of the cache node and the waiting list, if one or more conditions are met.

2. The method of claim 1, wherein the one or more conditions to meet to execute the delete operations include:
    a hit count for the cache node at the waiting list is equal to a hit count for the cache node at the cache; and
    a delete count for the cache node at the waiting list is equal to an add count for the cache node at the cache.

3. The method of claim 1, wherein the cache at the client has a size that exceeds a size of a cache at the agent for a period of time, and wherein the size of the cache at the client for the period of time enables the cache at the client to store hash values and corresponding print data that have been deleted at the cache at the agent, so as to enable print data that has been deduplicated at the agent to be located at the cache of the client for printing.

4. The method of claim 1, wherein:
    the data structure that specifies the add operation also specifies the delete operation to be applied to at least one cache node,
    the one or more conditions include one or more first conditions, and
    the method further comprises in response to one or more second conditions being met:
        executing the add operation to add a new cache node to the cache at the client; and
        after executing the add operation, executing the delete operation to delete at least one existing cache node at the cache of the client, wherein deletion of the at least one existing cache node is performed in response to one or more third conditions being met.

5. The method of claim 4, wherein the one or more first conditions, second conditions, or third conditions being met are based on whether the cache node, having the hash value, exists in the cache at the client and in the waiting list.

6. The method of claim 1, wherein after completion of the delete operation, a number of cache nodes in the cache at the client is same as a number of cache nodes in a cache at the agent, and wherein there is coherency between the cache at the client and the cache at the agent even though a sequence of the cache nodes at the cache of the client is different from a sequence of the cache nodes at the cache of the agent.

7. The method of claim 1, wherein the at least one virtual printer of the agent is an instantiation of the physical printer of the client.

8. A non-transitory computer-readable medium having instructions stored thereon, which in response to execution by one or more processors of a client, cause the one or more processors to perform a method to process print jobs that originate from an agent having at least one virtual printer, wherein the method comprises:
    receiving a print job having a data structure generated by the agent, wherein the data structure specifies at least one of an update operation, an add operation, or a delete operation to be performed for a cache node at a cache at the client, and wherein the data structure further specifies a hash value corresponding to print data at the cache node;
    reading the data structure in the print job;
    in response to determining that the data structure specifies the delete operation, postponing deletion of the print data from the cache node by storing the hash value corresponding to the print data in a waiting list at the client, wherein postponing the deletion of the print data from the cache node enables the client to subsequently locate the print data in the cache for printing at a physical printer of the client; and
    in response to receiving, after receiving the print job having the data structure that specifies the delete operation, another print job having another data structure that specifies the update operation which indicates that the agent has performed a deduplication process for the print data corresponding to the hash value:
        locating the print data in the cache using the hash value;
        sending the located print data to the physical printer for printing; and
        executing the delete operation to delete the print data from at least one of the cache node and the waiting list, if one or more conditions are met.

9. The non-transitory computer-readable medium of claim 8, wherein the one or more conditions to meet to execute the delete operations include:
    a hit count for the cache node at the waiting list is equal to a hit count for the cache node at the cache; and
    a delete count for the cache node at the waiting list is equal to an add count for the cache node at the cache.

10. The non-transitory computer-readable medium of claim 8, wherein the cache at the client has a size that exceeds a size of a cache at the agent for a period of time, and wherein the size of the cache at the client for the period of time enables the cache at the client to store hash values and corresponding print data that have been deleted at the cache at the agent, so as to enable print data that has been deduplicated at the agent to be located at the cache of the client for printing.

11. The non-transitory computer-readable medium of claim 8, wherein:
the data structure that specifies the add operation also specifies the delete operation to be applied to at least one cache node,
the one or more conditions include one or more first conditions, and
the method further comprises in response to one or more second conditions being met:
executing the add operation to add a new cache node to the cache at the client; and
after executing the add operation, executing the delete operation to delete at least one existing cache node at the cache of the client, wherein deletion of the at least one existing cache node is performed in response to one or more third conditions being met.

12. The non-transitory computer-readable medium of claim 11, wherein the one or more first conditions, second conditions, or third conditions being met are based on whether the cache node, having the hash value, exists in the cache at the client and in the waiting list.

13. The non-transitory computer-readable medium of claim 8, wherein after completion of the delete operation, a number of cache nodes in the cache at the client is same as a number of cache nodes in a cache at the agent, and wherein there is coherency between the cache at the client and the cache at the agent even though a sequence of the cache nodes at the cache of the client is different from a sequence of the cache nodes at the cache of the agent.

14. The non-transitory computer-readable medium of claim 8, wherein the at least one virtual printer of the agent is an instantiation of the physical printer of the client.

15. A client device, comprising:
a processor; and
a non-transitory computer-readable medium coupled to the processor and having instructions stored thereon, which in response to execution by the processor, cause the processor to perform operations to process print jobs that originate from an agent having at least one virtual printer, wherein the operations comprise:
receive a print job having a data structure generated by the agent, wherein the data structure specifies at least one of an update operation, an add operation, or a delete operation to be performed for a cache node at a cache at the client device, and wherein the data structure further specifies a hash value corresponding to print data at the cache node;
reading the data structure in the print job;
in response to determination that the data structure specifies the delete operation, postpone deletion of the print data from the cache node by storing the hash value corresponding to the print data in a waiting list at the client device, wherein postponing the deletion of the print data from the cache node enables the client device to subsequently locate the print data in the cache for printing at a physical printer of the client device; and
in response to receiving, after receiving the print job having the data structure that specifies the delete operation, another print job having another data structure that specifies the update operation which indicates that the agent has performed a deduplication process for the print data corresponding to the hash value:
locate the print data in the cache using the hash value;
send the located print data to the physical printer for printing; and
execute the delete operation to delete the print data from at least one of the cache node and the waiting list, if one or more conditions are met.

16. The client device of claim 15, wherein the one or more conditions to meet to execute the delete operations include:
a hit count for the cache node at the waiting list is equal to a hit count for the cache node at the cache; and
a delete count for the cache node at the waiting list is equal to an add count for the cache node at the cache.

17. The client device of claim 15, wherein the cache at the client device has a size that exceeds a size of a cache at the agent for a period of time, and wherein the size of the cache at the client device for the period of time enables the cache at the client device to store hash values and corresponding print data that have been deleted at the cache at the agent, so as to enable print data that has been deduplicated at the agent to be located at the cache of the client device for printing.

18. The client device of claim 15, wherein:
the data structure that specifies the add operation also specifies the delete operation to be applied to at least one cache node,
the one or more conditions include one or more first conditions, and
the operations further comprise in response to one or more second conditions being met:
execute the add operation to add a new cache node to the cache at the client device; and
after executing the add operation, execute the delete operation to delete at least one existing cache node at the cache of the client device, wherein deletion of the at least one existing cache node is performed in response to one or more third conditions being met.

19. The client device of claim 18, wherein the one or more first conditions, second conditions, or third conditions being met are based on whether the cache node, having the hash value, exists in the cache at the client device and in the waiting list.

20. The client device of claim 15, wherein after completion of the delete operation, a number of cache nodes in the cache at the client device is same as a number of cache nodes in a cache at the agent, and wherein there is coherency between the cache at the client device and the cache at the agent even though a sequence of the cache nodes at the cache of the client device is different from a sequence of the cache nodes at the cache of the agent.

21. The client device of claim 15, wherein the at least one virtual printer of the agent is an instantiation of the physical printer of the client device.

* * * * *